Aug. 16, 1966     C. M. SACHS     3,266,495

BRASSIERE

Filed April 18, 1963

INVENTOR
Charles M. Sachs

BY Anthony P. Mentis
ATTORNEY

3,266,495
BRASSIERE

Charles M. Sachs, Fort Lee, N.J., assignor to International Latex Corporation, Dover, Del., a corporation of Delaware
Filed Apr. 18, 1963, Ser. No. 273,988
7 Claims. (Cl. 128—479)

The present invention is a laminated structure for use in brassieres and other articles and a method of making same.

In the brassiere industry there is a definite market for padded brassieres to fill out the under-developed female form. Many materials have been suggested as padding including foams made from natural and synthetic rubber but these have not been completely satisfactory because they are not porous enough and become too hot upon prolonged wear. They have been unsatisfactory also in not being able to withstand machine washing and such brassieres have been recommended for hand-washing only. Foams made of polyurethane are resilient, light, porous and durable enough to withstand machine washing but suffer from a defect of their own which has severely limited their use, particularly in brassieres. This defect is their pronounced tendency to discolor badly upon aging and exposure to light. Efforts to minimize this undesirable quality have heretofore been unsuccessful.

The present inventor has unexpectedly discovered how to obviate this disadvantage of polyurethane foam to obtain brassieres which have the proper hand and feel, are porous and machine-washable, and whose original color is not influenced by any discoloration of the polyurethane foam.

In accordance with the present invention a composite fabric is produced which is comprised essentially of a first fabric lamination of two or more layers of porous fabric glued together with a water-soluble adhesive; a second fabric lamination similarly produced; and a sheet of resilient porous polyurethane foam bonded between the two aforesaid fabric laminations. This structure is porous, machine washable and retains its original color without discoloring. Composite fabrics of this type provide distinct advantages for making brassieres.

A more detailed description of the present invention may be had upon reference to the accompanying drawing wherein.

Figure 1:
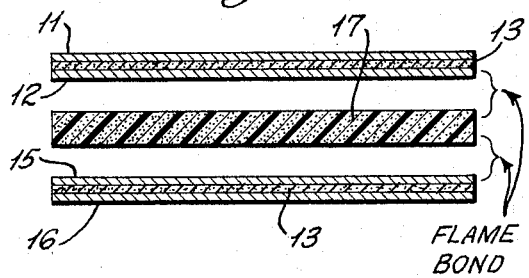
FIGURE 1 is an exploded diagrammatic view showing the arrangement of the various elements.
Figure 2:
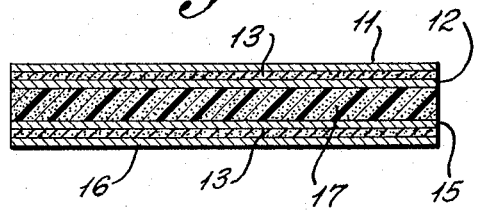
FIGURE 2 is a diagrammatic view of the finished, bonded composite fabric.

In the drawing where one embodiment of the invention is illustrated, FIGURE 1 shows a first fabric combination of two layers of fabric 11 and 12 bonded with a layer of water-soluble adhesive 13. A second fabric combination of two fabric layers 15 and 16 also have a bonding layer of water-soluble adhesive 13. Each of these two fabric combinations may be prepared by known methods of lamination. For example the adhesive may be spread upon the top surface of fabric 12 by roller, spray, knife or other technique etc. and the second fabric 11 placed upon the exposed adhesive layer and the whole united by means of heat, pressure or a combination of both. A similar process may be used to laminate the two fabric layers 15 and 16. When these two parts are completed, they are bonded to either side of the polyurethane foam 17 by means available to the art including heat or adhesives which form porous bonds when dry. A presently preferred method is the use of heat or flame lamination as described in U.S. Patent 2,957,793. In flame lamination the polyurethane foam sheeting is exposed to a gas flame which melts a thin surface layer of the foam to make it tacky. The foam is then slightly cooled by passing it over a cold roller and fed simultaneously with the first fabric combination into a nip roller which forces the two materials together, creating a firm and lasting bond. When this has been completed, the other surface of the foam is similarly heated and bonded to the second fabric combination. The finished composite fabric as shown diagrammatically in FIGURE 2 is then ready to be cut into suitable shapes and assembled into brassieres or other articles of clothing.

Figure 3:
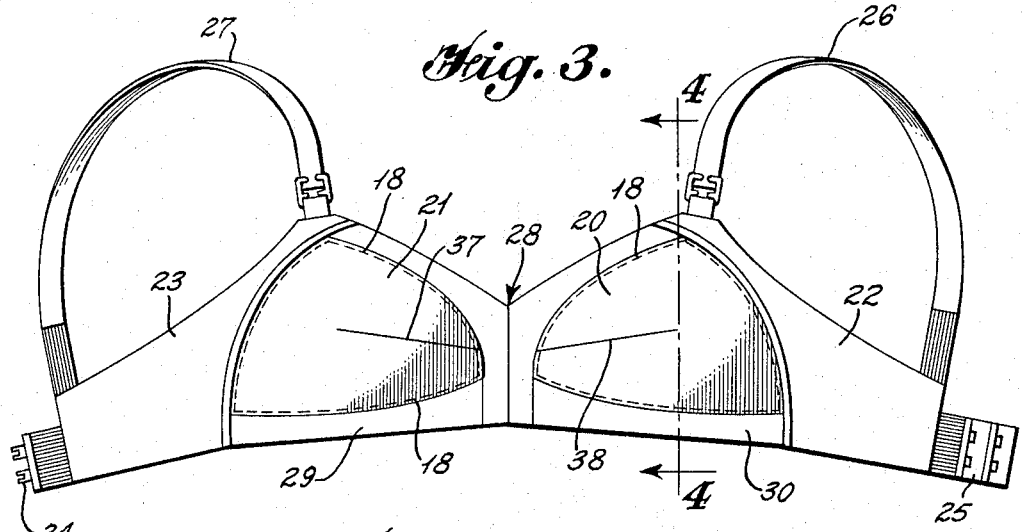
FIGURE 3 is a front elevation of a brassiere provided with the composite fabric according to the invention.
Figure 4:
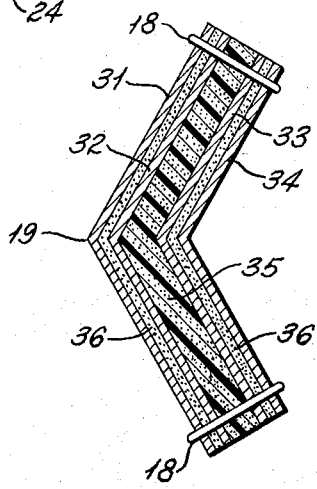
FIGURE 4 is an exaggerated diagrammatic view along line 4—4 of FIGURE 3 before the brassiere has been washed.
Figure 5:
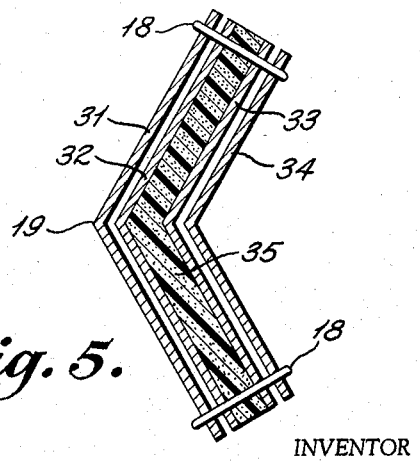
FIGURE 5 shows the same exaggerated view of FIGURE 4 after the brassiere has been washed and the water-soluble adhesive dissolved away.

The brassiere shown in FIGURE 3 comprises breast cups 20, 21, two back portions 22, 23, with hooks 24 and eyes 25 and two shoulder straps 26, 27. The central portion 28 contains the two cups and front panels 29, 30 which may or may not be elastic. The breast cups each comprise a porous outer fabric layer 31, a second porous fabric layer 32 flame bonded to a polyurethane foam layer 35, an inner porous fabric layer 33 flame bonded to the inner surface of the foam, and an innermost porous fabric layer 34. Fabric layers 31 and 32 may be arranged with the warp threads of one fabric parallel with or angularly disposed to the warp threads of the other and may advantageously be tricot. All of these layers are full fashioned with a central high point 19 by virtue of darts 37, 38. Peripheral stitching 18 holds the cup assembly in permanent position. FIGURE 4 shows in exaggerated diagrammatic view the finished brassiere where the water-soluble adhesive 36 uniting the fabric layers 31, 32 and 33, 34, is still present. FIGURE 5 shows the same exaggerated diagrammatic view of the brassiere after it has been washed and the water-soluble adhesive has been dissolved away. A distinct advantage of the invention is that the original smooth contour of the breast cups is essentially maintained after the brassiere has been washed. It is to be noted that the bond between the polyurethane foam and fabric layers 32 and 33 remains intact and is not disturbed by the water-washing whereas fabric layers 31 and 34 have become delaminated from layers 32 and 33 respectively. The delamination of the outer layers results in a small air space between layers 31 and 32 and between layers 33 and 34 so that layer 31, for example, stands away from layer 32. It is a noteworthy feature of the invention that any discoloration which the polyurethane foam may undergo upon aging or exposure to light does not become noticeable. It may be theorized that the discoloration of the foam is not strong enough to show through the slight air space between layers 31 and 32 and 33 and 34 or that the discoloration is absorbed by the immediately adjacent, permanently bonded fabric layers 32 and 33, but regardless of theory it is a fact that brassieres made according to the invention are highly desirable because of the avoidance of unwanted color.

Any fabric which is porous may be used, whether stretchable or non-stretchable. In a commercial method by which the fabrics are flame laminated to the polyurethane foam, a certain amount of elongation of the foam occurs while it is soft and tacky. Stretchable fabrics are preferred in this instance since they are able to accommodate to the elongation and subsequent retraction of the foam and thus avoid the puckering and creasing which could otherwise occur which non-stretchable fabrics. Examples of suitable stretchable fabrics are knitted fabrics including tricot and jersey, Helanca, stretchable cotton fabrics, elastic fabrics containing rubber, and the like. Instead of the flame lamination process, the fabrics may be bonded to the foam with permanent glues. With this method no appreciable stretching or contracting of the foam occurs and non-stretchable fabrics may be suitably used. The glues may be applied by roller, spray, knife or other technique known to the art and should be those which form a porous bond so that the desired porosity of the finished composite fabric is maintained. For purely decorative purposes an additional layer of fabric such as lace may be used with the composite fabric as an outer covering. There would thus be used, for example, an outer part of lace-tricot-tricot laminated with water-soluble adhesive prior to being flame bonded to the polyurethane foam.

As mentioned earlier the water-soluble adhesive may be coated on the full area of the fabric. For purposes of economy and to facilitate the obtaining of proper hand and feel, it is presently preferred to apply the water-soluble adhesive in spaced or discontinuous areas. These areas may be of any desired size and arranged in any desired manner. They may be as small as 1/16" dots of adhesive approximately 1/8" or more apart. The adhesive may be applied in spaced spots by known means including a roll having spaced protuberances, contacting the fabric with a smooth roll dipping in adhesive superposing another layer of fabric on the adhesive surface of the coated fabric and consolidating the laminated structure by means of pressure rolls, with or without the use of heat. The water-soluble adhesive may be applied in the form of dots, diamonds, squares, strips or any desired design.

Water-soluble adhesives which dissolve under the influence of water may be made from gelatin, casein, vegetable proteins such as soya proteins, mucilage, starch, agar, pectin, gums such as gum arabic and gum tragacanth, water-soluble cellulose compounds such as carboxymethyl cellulose, methyl cellulose, etc. and water-soluble synthetic resins. The latter class include sodium polyacrylate, polyethylacrylate, polymethacrylic acid, sodium and ammonium salts of maleic acid copolymers, polyvinyl alcohol, polyvinyl acetate and the like. The adhesives may be used with plasticizers and softening agents if desired. The above recitation of suitable adhesives is not to be taken as complete since these will suggest other water-soluble adhesives to the person skilled in the art.

Urethanes are chemical compounds containing the grouping

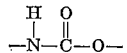

and polyurethanes are polymeric compounds containing more than one such grouping. The base materials used to form the polyurethane structure vary widely as to chemical composition and molecular structure and the physical characteristics vary widely also, depending on the basic compounds used and their specific inter-reactions. Polyurethanes as a group are outstanding in toughness, resiliency and abrasion resistance. One method of preparing these materials involves the reaction of diisocyanates on essentially linear polyester resins having terminal OH groups, which can be made from alcohols and carboxylic acids well known to the art, for example ethylene glycol, propylene glycol and adipic acid. Polyethers are another class of materials which may be used to prepare polyurethane foams. They may be prepared from polyglycols such as polyethylene glycol, polypropylene glycol, polybutylene glycol, polyoxyethylene glycol and the like. A fuller discussion of polyurethanes may be found in German Plastics Practice by DeBell et al. 1946 and U.S. Patents 2,284,896; 2,292,443; 2,333,639 and 2,374,163. In certain types of polymer formation carbon dioxide gas is evolved as a by-product of the reaction and this property has been utilized to create the cellular structure of polyurethane foam which may have as high as 30 to 40 times the volume of the starting material.

The invention has been shown in but one embodiment and it is obvious to those skilled in the art that it is not so limited but is susceptible of various changes and modifications without departing from the spirit and scope of the claimed invention.

I claim:

1. A brassiere having soft, porous, machine-washable non-discoloring cups each comprising a first fabric lamina of at least two layers of stretchable porous fabric bonded together with water-soluble adhesive, a second fabric lamina of at least two layers of stretchable porous fabric similarly bonded, and a layer of porous resilient polyurethane foam positioned between said fabric laminae and permanently bonded to the innermost layers thereof to form a unitary structure, said unitary structure being permanently attached at the periphery thereof, whereby washing of the brassiere removes the water-soluble adhesive to allow each layer of said laminae except said innermost layers to move independently of each other layer, and said innermost layers and said polyurethane foam being capable of moving as a unit relative to said other layers.

2. A brassiere according to claim 1 in which said first fabric lamina comprises an outer decorative layer of lace and two layers of tricot, said layers are bonded together with a water-soluble adhesive of a polyacrylate, said polyurethane foam is prepared from a polyether, and said second fabric lamina comprises two layers of tricot similarly bonded as said first fabric lamina.

3. A brassiere according to claim 1 in which said water-soluble adhesive is present in spaced areas.

4. A brassiere having soft, porous, machine-washable, non-discoloring cups each comprising a first fabric lamina of lace-tricot-tricot spot glued together with water-soluble polyacrylate adhesive, a second fabric lamina of two layers of tricot similarly bonded, and a layer of porous, resilient polyurethane foam permanently bonded to the innermost layers of tricot of said laminae, whereby washing of said brassiere removes said soluble polyacrylate adhesive to allow each layer of said laminae, except for said innermost layers, to move independently of each other layer, and said innermost layers and polyurethane foam being capable of moving as a unit relative to said other layers of said laminae.

5. A brassiere having porous, machine-washable cups each comprising a layer of porous resilient polyurethane foam permanently bonded to a stretchable porous fabric and a second stretchable porous fabric separated from said bonded fabric by a soluble adhesive, said polyurethane foam and porous fabrics being permanently attached to the periphery thereof with the polyurethane foam being the innermost layer, whereby subsequent removal of said soluble adhesive allows said second porous fabric to move independently of said first porous fabric and polyurethane foam, and said first porous fabric and polyurethane foam being capable of moving as a unit relative to said second porous fabric.

6. A brassiere according to claim 5 in which said polyurethane foam and porous fabrics are permanently attached by stitches.

7. A brassiere having porous, machine-washable cups each comprising a layer of porous resilient polyurethane foam having one surface permanently bonded to a first layer of tricot, a second layer of tricot spaced from said first layer of tricot, a third layer of decorative stretchable fabric spaced from the said second layer, a fourth layer of tricot permanently bonded to the other surface of said polyurethane foam, and a fifth layer of tricot spaced from the said fourth layer, said polyurethane foam, tricot layers, and decorative stretchable fabric being peripherally sewn together for permanently holding the layers and foam together.

References Cited by the Examiner
UNITED STATES PATENTS

| | | | |
|---|---|---|---|
| 2,639,248 | 5/1953 | Overholt | 161—159 |
| 2,648,619 | 8/1953 | Alderfer | 154—54 |
| 2,704,845 | 3/1955 | Gluckin | 128—479 |
| 2,727,278 | 12/1955 | Thompson | 264—45 |
| 2,897,821 | 8/1959 | Lerner | 128—479 |
| 2,921,457 | 1/1960 | Evans | 66—176 |
| 2,957,793 | 10/1960 | Dickey | 156—82 |
| 2,962,025 | 11/1960 | Bertrand | 128—516 |
| 3,028,279 | 4/1962 | Heberlein | 161—159 |
| 3,029,821 | 4/1962 | Plehn | 128—479 |
| 3,057,766 | 10/1962 | Dickey | 156—82 |
| 3,098,235 | 7/1963 | Gusman | 161—148 |
| 3,108,598 | 10/1963 | Sachs | 128—516 |

FOREIGN PATENTS 494,929 11/1938 Great Britain.

ADELE M. EAGER, *Primary Examiner.*